(12) United States Patent
Kim et al.

(10) Patent No.: US 11,928,967 B2
(45) Date of Patent: Mar. 12, 2024

(54) SYSTEM AND METHOD OF USING A VEHICLE AS A BACKUP ROADSIDE UNIT (RSU)

(71) Applicant: TOYOTA MOTOR ENGINEERING & MANUFACTURING NORTH AMERICA, INC., Erlanger, KY (US)

(72) Inventors: BaekGyu Kim, Mountain View, CA (US); Baik Hoh, Mountain View, CA (US); Hao Yang, Mountain View, CA (US); Shalini Keshavamurthy, Mountain View, CA (US); Kentaro Oguchi, Mountain View, CA (US); Onur Altintas, Mountain View, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 273 days.

(21) Appl. No.: 16/431,438

(22) Filed: Jun. 4, 2019

(65) Prior Publication Data
US 2020/0388161 A1 Dec. 10, 2020

(51) Int. Cl.
G08G 1/00 (2006.01)
G01C 21/34 (2006.01)
G08G 1/01 (2006.01)
H04W 4/44 (2018.01)
H04W 4/46 (2018.01)

(52) U.S. Cl.
CPC ......... *G08G 1/202* (2013.01); *G01C 21/3438* (2013.01); *G08G 1/0112* (2013.01); *G08G 1/0116* (2013.01); *H04W 4/44* (2018.02); *H04W 4/46* (2018.02)

(58) Field of Classification Search
CPC .... G08G 1/202; G08G 1/0112; G08G 1/0116; H04W 4/46; H04W 4/44; G01C 21/3438
See application file for complete search history.

(56) References Cited

U.S. PATENT DOCUMENTS

| 7,421,334 B2 | 9/2008 | Dahlgren et al. |
| 8,928,493 B2 | 1/2015 | Mantalvanos |

(Continued)

OTHER PUBLICATIONS

Tonguz, O. K., & Viriyasitavat, W. (2013). Cars as roadside units: a self-organizing network solution. IEEE Communications Magazine, 51(12), 112-120. (Year: 2013).*

(Continued)

*Primary Examiner* — Aniss Chad
*Assistant Examiner* — Stephanie T Su
(74) *Attorney, Agent, or Firm* — SEYFARTH SHAW LLP

(57) ABSTRACT

A method for deploying of a backup roadside unit (RSU) vehicle to provide on-demand RSU services is described. The method may include determining, by a server, a resource specification to deploy a selected backup RSU vehicle to a requested site. The determining of the resource specification may be performed by the server in response to a scene description received from a requestor. The method also includes sending a dispatch instruction to the selected backup RSU vehicle to deploy the selected backup RSU vehicle to the requested site. In this method, a hardware/software capability of the selected backup RSU vehicle is matched to the resource specification determined by the server.

17 Claims, 11 Drawing Sheets

(56) References Cited

U.S. PATENT DOCUMENTS

| | | | |
|---|---|---|---|
| 9,751,463 B1* | 9/2017 | Ramcharitar | G08G 1/052 |
| 9,811,085 B1 | 11/2017 | Hayes et al. | |
| 9,930,509 B2 | 3/2018 | Nishimura et al. | |
| 10,268,975 B1* | 4/2019 | Briggs | G07C 5/008 |
| 10,269,242 B2* | 4/2019 | Ahmad | B60W 30/00 |
| 2019/0392712 A1* | 12/2019 | Ran | G08G 1/096725 |
| 2020/0229206 A1* | 7/2020 | Badic | H04W 4/023 |
| 2020/0250989 A1* | 8/2020 | Amacker | G08G 1/0112 |

OTHER PUBLICATIONS

Billheimer, John W.; Kaylor, Ken; Shade, Charles; "Use of Videotape in HOV Lane Surveillance and Enforcement," 1990 (Year: 1990).*

TImo Sukuvarra, "Development, Implementation and Evaluation of an Architecture for Vehicle-to-Vehicle and Vehicle-to-Infrastructure Networking," Finnish Meteorological Institute Contributions, 2015, p. 118, Oslo, Finland.

* cited by examiner

SYSTEM AND METHOD OF USING A VEHICLE AS A BACKUP ROADSIDE UNIT (RSU)

BACKGROUND

Field

Certain aspects of the present disclosure generally relate to connected vehicle applications and, more particularly, to a system and method for a vehicle backup roadside unit (RSU).

Background

Connected vehicle applications enable support for intelligent transportation systems (ITS). In general, ITS are advanced applications integrating telecommunications, electronics, and information technologies to support connected vehicles. ITS applications apply transport engineering to plan, design, operate, maintain, and manage transport systems of a connected vehicle. In particular, these ITS applications provide improved user information and increased safety by coordinating 'smarter' use of transport networks.

Connected vehicle applications support vehicle-to-vehicle (V2V) communications and vehicle-to-infrastructure (V2I) with wireless technology. For example V2V communications use wireless signals to send information back and forth between other connected vehicles (e.g., location, speed, and/or direction). Conversely, V2I communications involve vehicle to infrastructure (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

A roadside unit (RSU) plays an important role in V2I communications services. Conventionally, most RSUs are installed in fixed locations or physically integrated with existing infrastructure (e.g., traffic lights). Fixed RSUs, however, have several drawbacks: (1) some V2I services are occasionally specified for temporary traffic conditions, which means permanently installing RSUs for these temporary traffic conditions is not cost-effective; and (2) fixed RSUs cannot adapt to on-demand services involving other functionality currently not supported in the fixed location.

SUMMARY

A method for deploying of a backup roadside unit (RSU) vehicle to provide on-demand RSU services is described. The method may include determining, by a server, a resource specification to deploy a selected backup RSU vehicle to a requested site. The determining of the resource specification may be performed by the server in response to a scene description received from a requestor. The method also includes sending a dispatch instruction to the selected backup RSU vehicle to deploy the selected backup RSU vehicle to the requested site. In this method, a hardware/software capability of the selected backup RSU vehicle is matched to the resource specification determined by the server.

A system to deploy of a backup roadside unit (RSU) vehicle to provide on-demand RSU services is described. The system may include a server configured to determine a resource specification to deploy a selected backup RSU vehicle to a requested site. The determination of the resource specification may be performed by the server in response to a scene description received from a requestor. The system may further include a fleet vehicle management configured to send a dispatch instruction to the selected backup RSU vehicle to deploy the selected backup RSU vehicle to the requested site. In this system, a hardware/software capability of the selected backup RSU vehicle is matched to the resource specification received from the server.

A non-transitory computer-readable medium having program code recorded thereon for deploying of a backup roadside unit (RSU) vehicle to provide on-demand RSU services is described. The program code is executed by a processor. The non-transitory computer-readable medium may include program code to determine, by a server, a resource specification to deploy a selected backup RSU vehicle to a requested site. The determination of the resource specification may be performed by the server in response to a scene description received from a requestor. The non-transitory computer-readable medium may include program code to send a dispatch instruction to the selected backup RSU vehicle to deploy the selected backup RSU vehicle to the requested site. In this method, a hardware/software capability of the selected backup RSU vehicle is matched to the resource specification determined by the server.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, ho ever, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
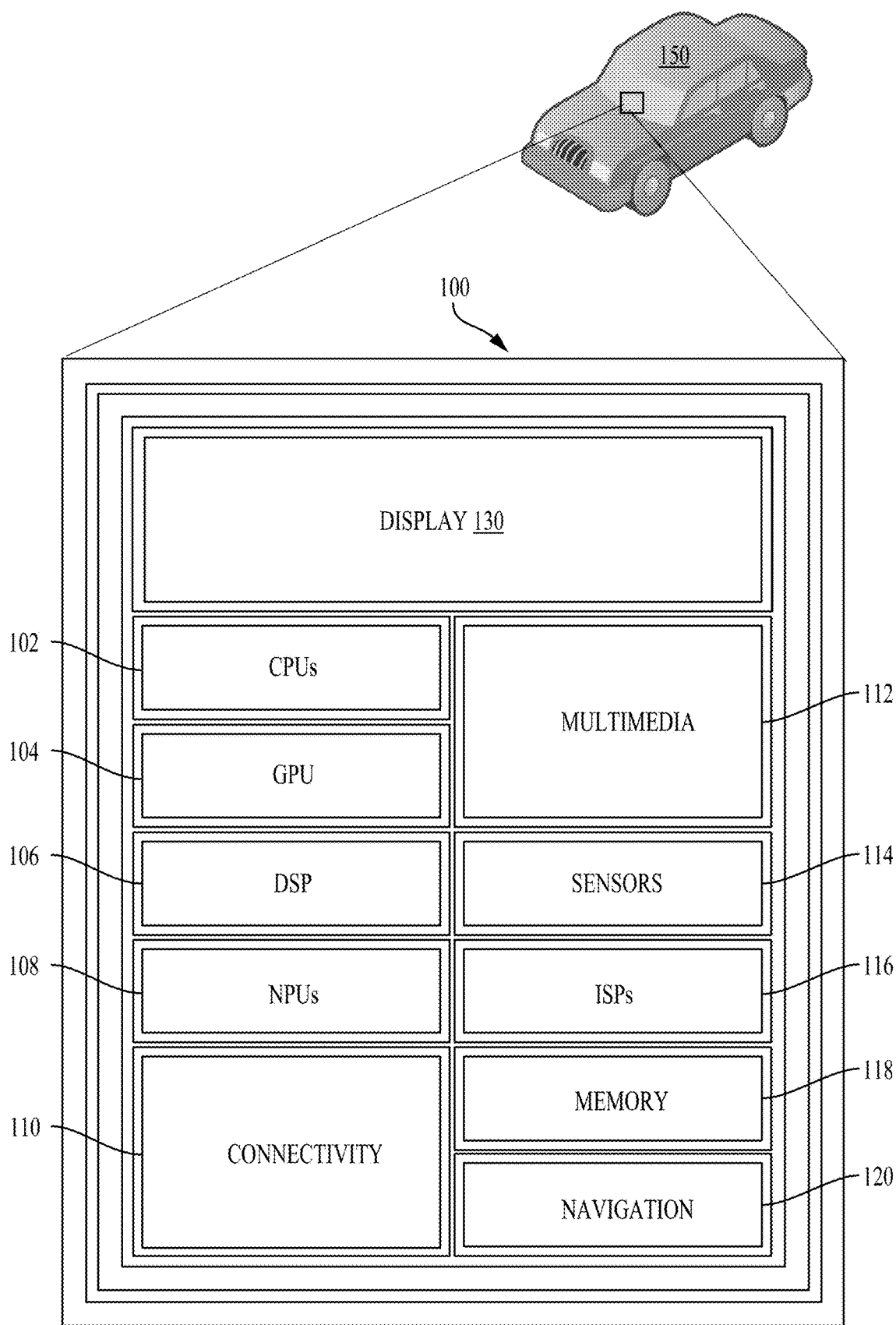
FIG. 1 illustrates an example implementation of designing a neural network using a system-on-a-chip (SOC) for a vehicle backup roadside unit (RSU) system of an autonomous vehicle, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Aspects of the present disclosure are directed to a system and method of using a vehicle as a backup roadside unit. A roadside unit (RSU) plays a key role in V2I (vehicle-to-infrastructure) services. Conventionally, most RSUs are installed in fixed locations or physically integrated with existing infrastructure (e.g., traffic lights). Fixed RSUs, however, have several drawbacks: (1) some V2I services are occasionally desired for temporary traffic conditions, which means permanently installing RSUs for these temporary traffic conditions is not cost-effective; and (2) fixed RSUs cannot adapt to on-demand services involving other functionality currently not supported in the fixed location.

Aspects of the present disclosure consider the problem of assigning RSU functions to on-demand vehicles configured for V2I services. For example, an on-demand vehicle is assigned an RSU function and dispatched to provide various V2I services (e.g., RSU functions), which are difficult to supply with fixed location RSUs. One aspect of the present disclosure allows an autonomous vehicle to serve as a vehicle backup RSU in a systematic way. In particular, the system automatically identifies the appropriate autonomous vehicle available to serve a particular scene where an RSU function is desired. Selecting the appropriate autonomous vehicle is based on, for example, a purpose, a scene description, and an allowed resource specification. A vehicle backup RSU system may be composed of a requester, a server, a fleet management, and a backup autonomous vehicle.

A requester of the vehicle backup RSU system may describe the scene (e.g., a marathon) in a machine-readable (e.g., understandable) format. The machine-readable scene description is communicated to a server, configured to select a backup autonomous vehicle and dispatch the selected autonomous vehicle to an area of interest within the described scene. In this configuration, for example, the requester is a management team of a marathon event responsible for describing information about the event (e.g., a location, type of event(s)), and aspects monitored or controlled by the backup autonomous vehicle dispatched to the scene. The scene description from the requestor is encoded in a machine-readable format and automatically processed by the server.

In this aspect of the present disclosure, the server receives the scene description from the requester, and is configured to extract a resource specification. The resource specification may describe a hardware/software capability (e.g., specification) best matching a desired support (e.g., RSU function) for the scene. For example, the resource specification describes a type of object detected (e.g., pedestrians), a type of control, and type of computation(s) and communication (s) provided. After extracting the resource specification, the server distributes the resource specification to various fleet management systems, which eventually select the backup autonomous vehicle.

According to aspects of the present disclosure, upon receipt of the resource specification, a fleet management system checks an inventory of vehicles. In this configuration, the fleet management system identifies a vehicle having a hardware equipment configuration (e.g., sensors, actuators) matching the resource specification. The fleet management system next sends backup instructions to the selected autonomous vehicle, which is dispatched to the scene. When the backup vehicle arrives at the scene, an appropriate message may be displayed on the vehicle display to appropriately park the car and perform the desired functionality. For example, the backup instruction specifies a parking place for the vehicle, and, optionally, whether to configure the vehicle in an automatic or manual mode for setting up the request sensors or actuators. Once all settings are complete, the dispatched autonomous vehicle initiates the backup operation (e.g., RSU function) at the scene.

FIG. 1 illustrates an example implementation of the aforementioned system and method for a vehicle backup roadside unit (RSU) system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code for detecting/recognizing an ado vehicle in a region of interest in an image captured by the sensor processor 114. The instructions loaded into a processor (e.g., CPU 102) may also include code for planning and control (e.g., intention prediction of the ado vehicle) in response to the ado vehicle detected/recognized in the region of interest in the image captured by the sensor processor 114.

Figure 2:
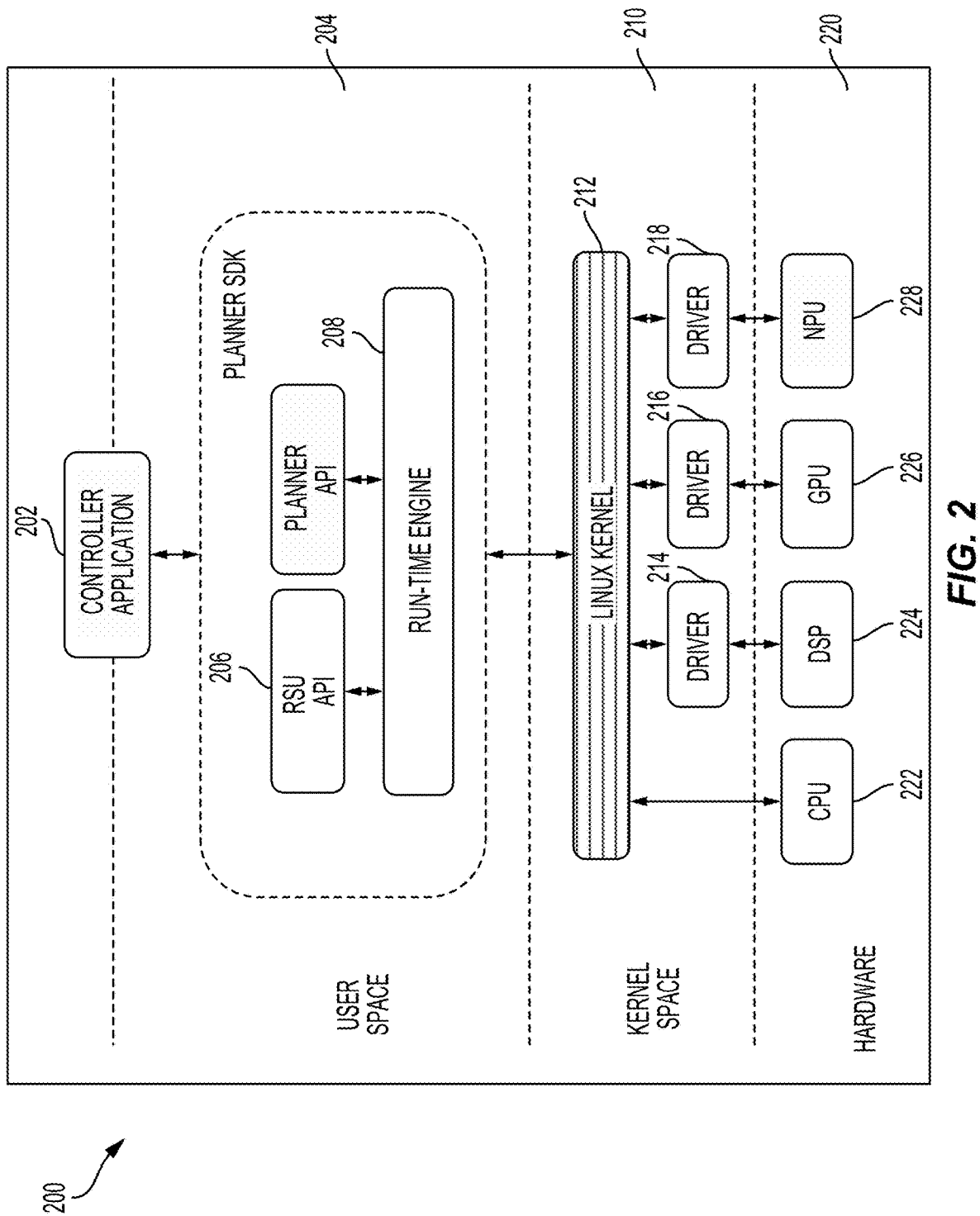
FIG. 2 is a block diagram illustrating a software architecture that may modularize artificial intelligence (AI) functions for a vehicle backup roadside unit (RSU) of an autonomous agent vision system, according to aspects of the present disclosure.
Figure 7:
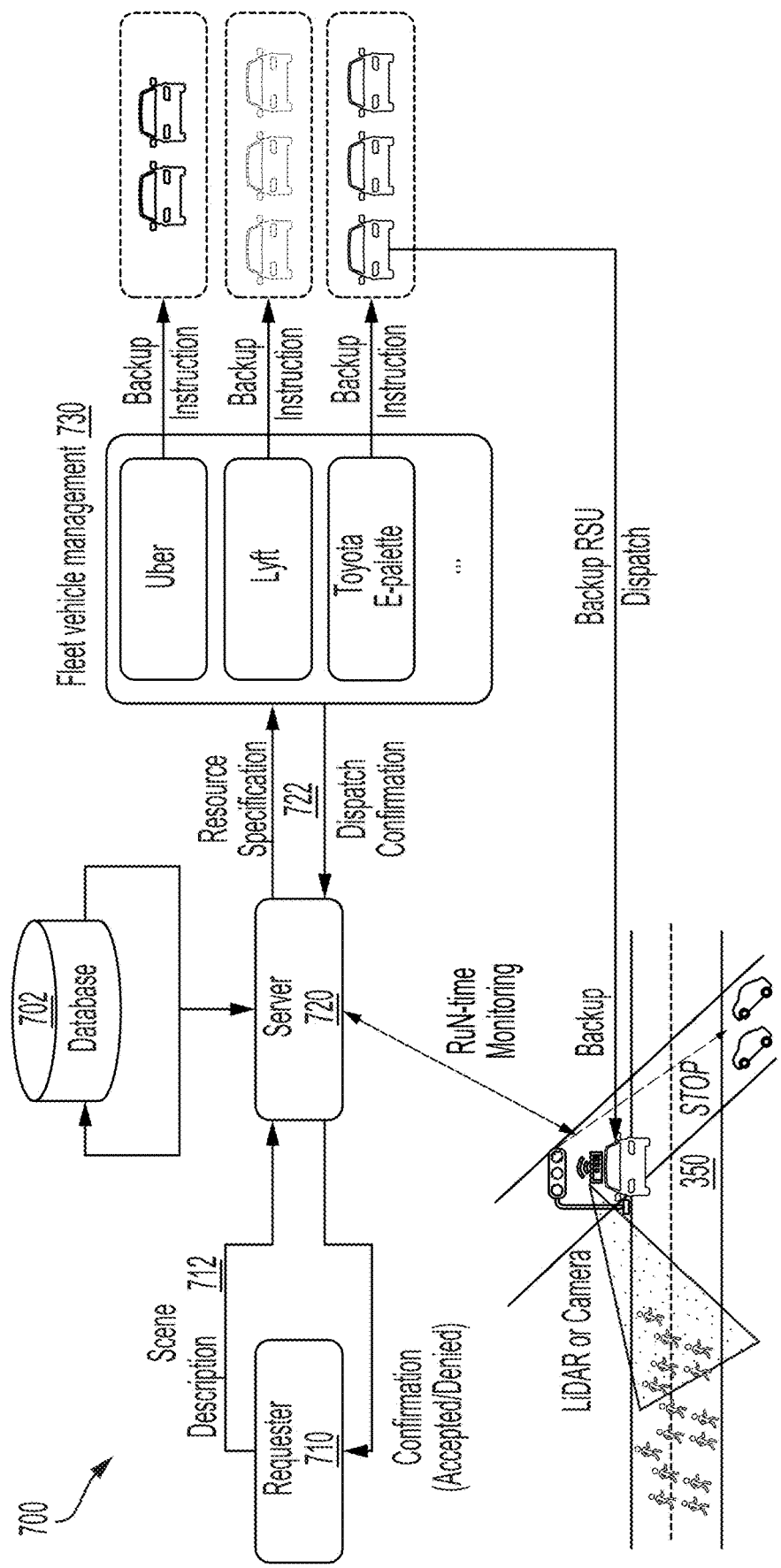
FIG. 7 is a system block diagram illustrating a backup vehicle roadside unit (RSU) system described with reference to the marathon event 500 of FIG. 5, according to aspects of the present disclosure.

FIG. 2 is a block diagram illustrating a software architecture 200 that may modularize artificial intelligence (AI) functions for planning and control of an autonomous agent for operation as a vehicle backup roadside unit (RSU), according to aspects of the present disclosure. Using the architecture, a controller application 202 may be designed such that it may cause various processing blocks of an SOC 220 (for example a CPU 222, a DSP 224, a GPU 226 and/or an NPU 228) to perform supporting computations during run-time operation of the controller application 202. While FIG. 2 describes the software architecture 200 for planning and control of an autonomous agent, it should be recognized vehicle backup RSU functionality is not limited to autonomous agents. According to aspects of the present disclosure, vehicle backup RSU functionality is applicable to any vehicle type, provided the vehicle is equipped with appropriate functions to operate as a vehicle backup RSU. For example, a ride-sharing vehicle may operate as a backup RSU, as shown in FIG. 7.

The controller application 202 may be configured to call functions defined in a user space 204 that may, for example, provide for backup RSU services. The controller application 202 may make a request to compile program code associated with a library defined in an RSU application programming interface (API) 206 to perform backup vehicle RSU functions. This request may ultimately rely on the output of a convolutional neural network configured to focus on portions of the sequence of images critical to RSU functions.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. FIG. 2 illustrates the Linux Kernel 212 as a software architecture for implementing planning and control of an autonomous agent to operate as a vehicle backup RSU. It should be recognized, however, aspects of the present disclosure are not limited to this exemplary software architecture. For example, other kernels may be used to provide the software architecture to support backup RSU functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
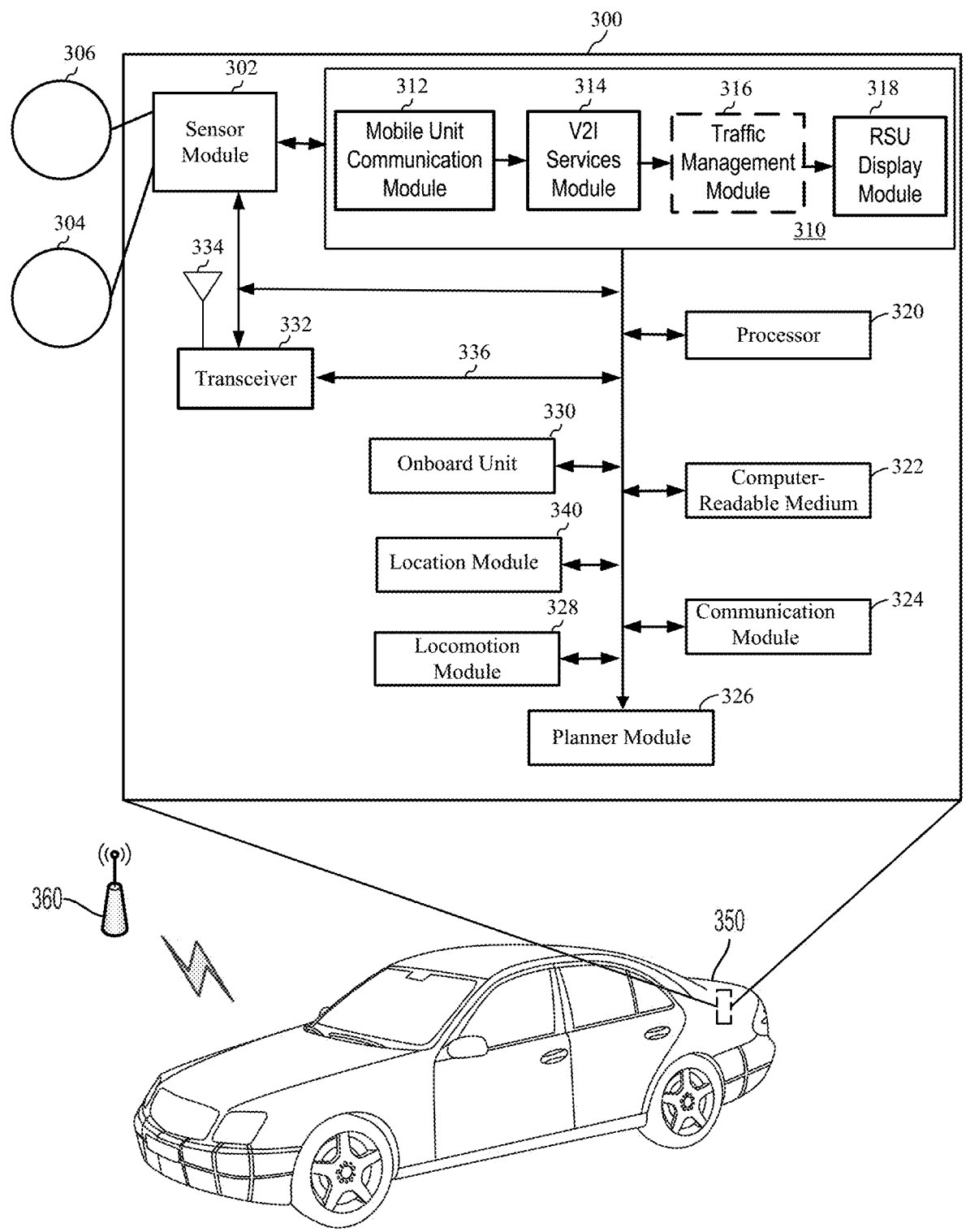
FIG. 3 is a diagram illustrating an example of a hardware implementation for a vehicle backup roadside unit (RSU) system, according to aspects of the present disclosure.

FIG. 3 is a diagram illustrating an example of a hardware implementation for a backup roadside unit (RSU) vehicle system 300, according to aspects of the present disclosure. The backup RSU vehicle system 300 may be configured for providing on-demand RSU services. The backup RSU vehicle system 300 may be a component of a vehicle, a robotic device, or other non-autonomous device (e.g., non-autonomous vehicles, ride-share cars, etc.). For example, as shown in FIG. 3, the backup RSU vehicle system 300 is a component of a car 350. Aspects of the present disclosure are not limited to the backup RSU vehicle system 300 being a component of the car 350. Other devices, such as a bus, motorcycle, or other like non-autonomous vehicle, are also contemplated for implementing the backup RSU vehicle system 300. In this example, the car 350 may be autonomous or semi-autonomous; however, other configurations for the car 350 are contemplated, such as non-autonomous vehicles including the ride-sharing fleet shown in FIG. 7.

The backup RSU vehicle system 300 may be implemented with an interconnected architecture, represented generally by an interconnect 336. The interconnect 336 may include any number of point-to-point interconnects, buses, and/or bridges depending on the specific application of the backup RSU vehicle system 300 and the overall design constraints. The interconnect 336 links together various circuits including one or more processors and/or hardware modules, represented by a sensor module 302, an on-demand RSU module 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The backup RSU vehicle system 300 includes a transceiver 332 coupled to the sensor module 302, the on-demand RSU module 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may transmit V2I service information from the on-demand RSU module 310 to connected vehicles within the vicinity of the car 350.

The backup RSU vehicle system 300 includes the processor 320 coupled to the computer-readable medium 322. The processor 320 performs processing, including the execution of software stored on the computer-readable medium 322 to provide functionality according to the disclosure. The software, when executed by the processor 320, causes the backup RSU vehicle system 300 to perform the various functions described for a vehicle backup RSU, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the on-demand RSU module 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication-Physical layer using microwave at 5.8 GHz (review); EN 12795: 2002 Dedicated Short-Range Communication (DSRC)-DSRC Data link layer: Medium Access and Logical Link Control (review); EN 12834:2002 Dedicated Short-Range Communication-Application layer (review); EN 13372: 2004 Dedicated Short-Range Communication (DSRC)-DSRC profiles for RTTT applications (review); and EN ISO 14906:2004 Electronic Fee Collection-Application interface.

A DSRC-compliant GPS unit within the location module 340 is operable to provide GPS data describing the location of the car 350 with space-level accuracy for accurately dispatching the car 350 to a scene involving on-demand RSU services. For example, the car 350 is parked in a predetermined location of the scene for providing on-demand RSU services during a temporary event (e.g., a marathon). Space-level accuracy means the location of the car 350 is described by the GPS data sufficient to confirm a location of the car 350 parking space. That is, the location of the car 350 within the scene is accurately determined with space-level accuracy based on the GPS data from the car 350.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the backup RSU vehicle system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The backup RSU vehicle system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

- Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.
- Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.
- Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.
- Level 3: In a Level 3 ADAS vehicle, within known, limited environments (such as freeways), the driver can safely turn their attention away from driving tasks, but must still be prepared to take control of the autonomous vehicle when needed.
- Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.
- Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The on-demand RSU module 310 may be in communication with the sensor module 302, the processor 320, the computer-readable medium 322, the communication module 324, the planner module 326, the locomotion module 328, the location module 340, the onboard unit 330, and the transceiver 332. In one configuration, the on-demand RSU module 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the on-demand RSU module 310 may receive sensor data directly from the first sensor 306 and the second sensor 304 to determine, for example, current traffic levels at a scene of requested on-demand RSU services.

As shown in FIG. 3, the on-demand RSU module 310 includes a mobile unit communication module 312, a vehicle-to-infrastructure (V2I) services module 314, a traffic management module 316, and an RSU display module 318. The mobile unit communication module 312, the vehicle-to-infrastructure (V2I) services module 314, the traffic management module 316, and the RSU display module 318 may be components of a same or different artificial neural network, such as a deep convolutional neural network (CNN). The on-demand RSU module 310 is not limited to a CNN. The on-demand RSU module 310 receives a data stream from the first sensor 306 and/or the second sensor 304. The data stream may include a 2D RGB image from the first sensor 306 and LiDAR data points from the second sensor 304. The data stream may include multiple frames, such as image frames.

The mobile unit communication module 312 may be configured to communicate with other connected vehicles within proximity of a scene in which on-demand RSU services are requested. For example, the car 350 is dispatched to the scene for which on-demand RSU services are requested. Once parked at the scene, the on-demand RSU module 310 communicates V2I services to connected vehicles near the scene using the V2I services module 314 in conjunction with the mobile unit communication module 312. For example, the car 350 may regulate traffic at the scene using the traffic management module 316 to display instructions from the car 350 using the RSU display module 318. For example, the car 350 may serve as a backup RSU to support on-demand V2I services specialized for a particular region, season, time of day for a temporary event (e.g., a construction site, occasional social event, police enforcement, etc.), as in FIGS. 4-6.

While FIG. 3 describes the a backup roadside unit (RSU) vehicle system 300 for providing on-demand RSU services by an autonomous vehicle (e.g., car 350), it should be recognized vehicle backup RSU functionality is not limited to autonomous vehicles. According to aspects of the present disclosure, vehicle backup RSU functionality is applicable to any vehicle type, provided the vehicle is equipped with appropriate functions to operate as a vehicle backup RSU. For example, a non-autonomous vehicle equipped with a portion of the backup RSU vehicle system 300, such as the on-demand RSU module 310, may support on-demand RSU services, according to aspects of the present disclosure. In a further configuration, a ride-sharing vehicle may operate to provide on-demand RSU services as a backup RSU, for example, as shown in FIG. 7.

Figure 4:
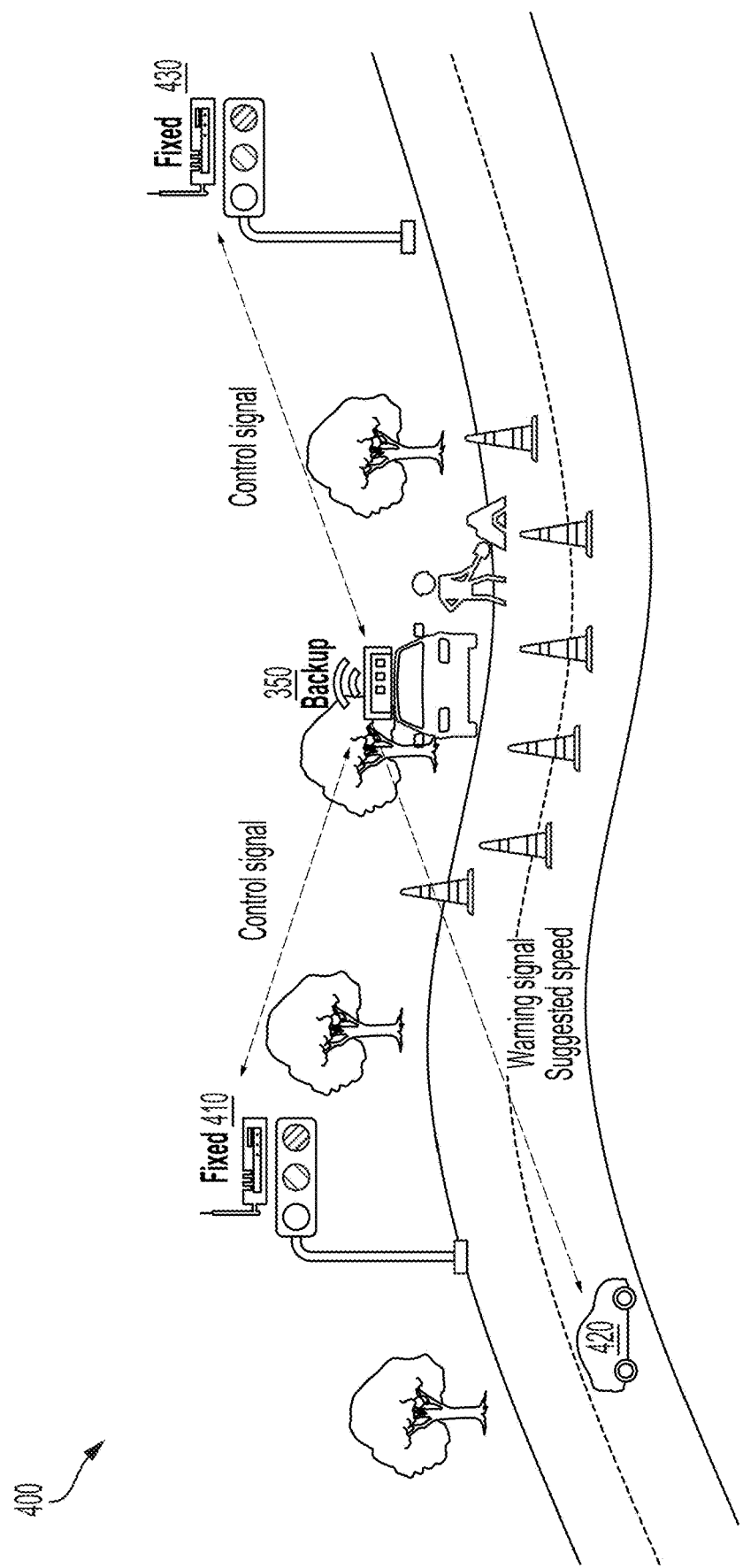
FIG. 4 is a block diagram illustrating a construction site for dispatching a vehicle backup roadside unit (RSU), according to aspects of the present disclosure.

FIG. 4 is a block diagram illustrating a construction site 400 for dispatching a vehicle backup RSU, according to aspects of the present disclosure. The construction site 400 is an example of an occasional event, in which fixed RSUs 410/430 are unable to monitor the road-side construction. In this example, the car 350 is dispatched to the construction site 400 and parked at a fixed location. The car 350 may communicate control signals to control nearby traffic signals through the fixed RSUs 410/430 through the on-demand RSU module 310. In operation, the car 350 may monitor the situation at the construction site 400 and communicate V2I service information (e.g., warning signal(s) and/or suggested speed(s)) to one of the connected vehicles 420 within a predetermined vicinity of the construction site 400. This V2I service information helps prevent a collision between the connected vehicles 420 and the construction site 400. The car 350 ensures the safety of any construction workers at the construction site 400 as well as the driver of one of the connected vehicles 420 during the temporary road-side construction event.

Figure 5:
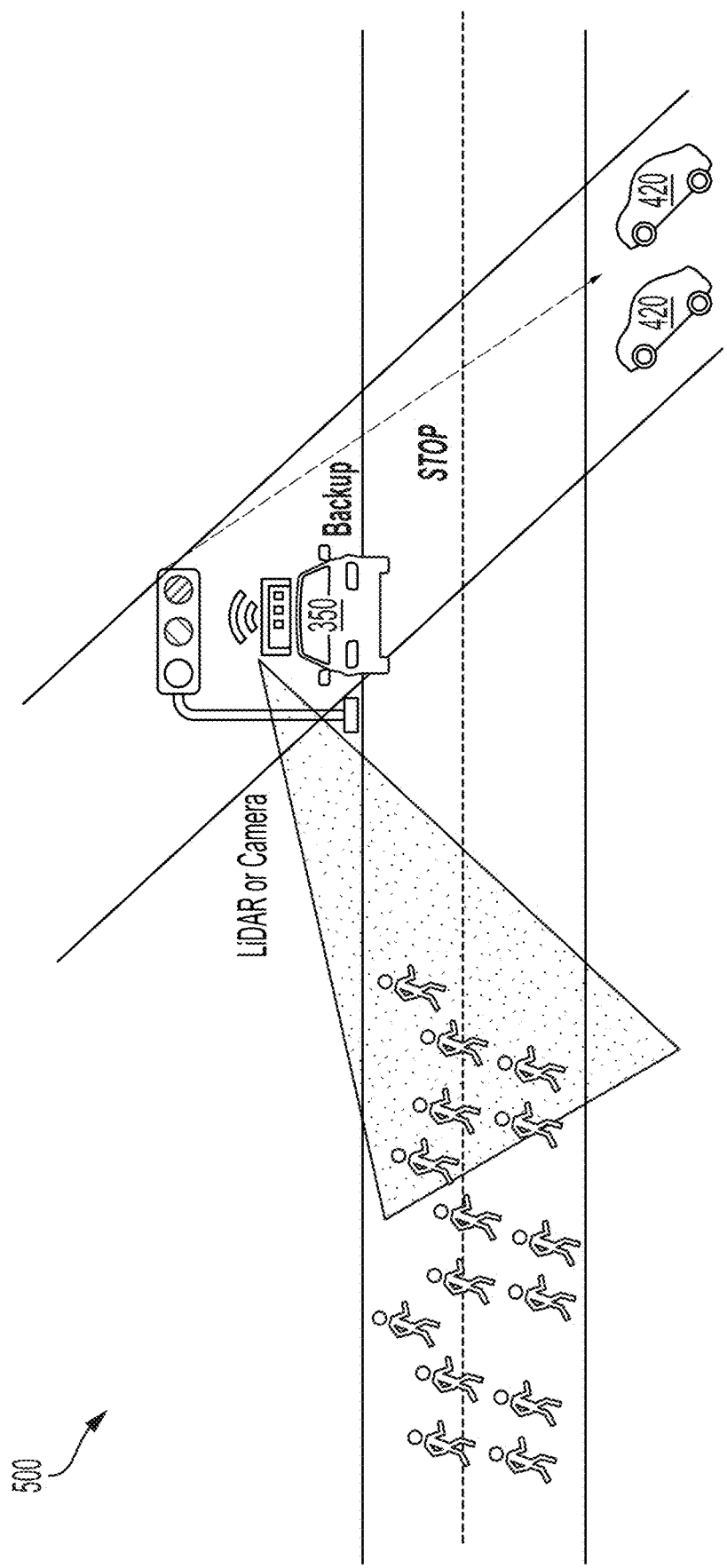
FIG. 5 is a block diagram illustrating a marathon event for dispatching a vehicle backup roadside unit (RSU), according to aspects of the present disclosure.

FIG. 5 is a block diagram illustrating a marathon event 500 for dispatching a vehicle backup RSU, according to aspects of the present disclosure. The marathon event 500 is an example of an occasional social event often leading to unnecessary road blockage when marathon runners are not present. In this example, the car 350 is dispatched to the marathon event 500 and parked at a fixed location. In operation, the car 350 monitors (e.g., LiDAR or camera) the situation at the marathon event 500 and communicates V2I service information (e.g., warning signal(s) and/or stop signal(s)) to connected vehicles 420 within a predetermined vicinity of the marathon event 500. This V2I service information helps protected marathon runners from the connected vehicles 420. In addition, the car 350 prevents unnecessary road blockage by directing the connected vehicles 420 when marathon runners are not present during the marathon event 500.

Figure 6:
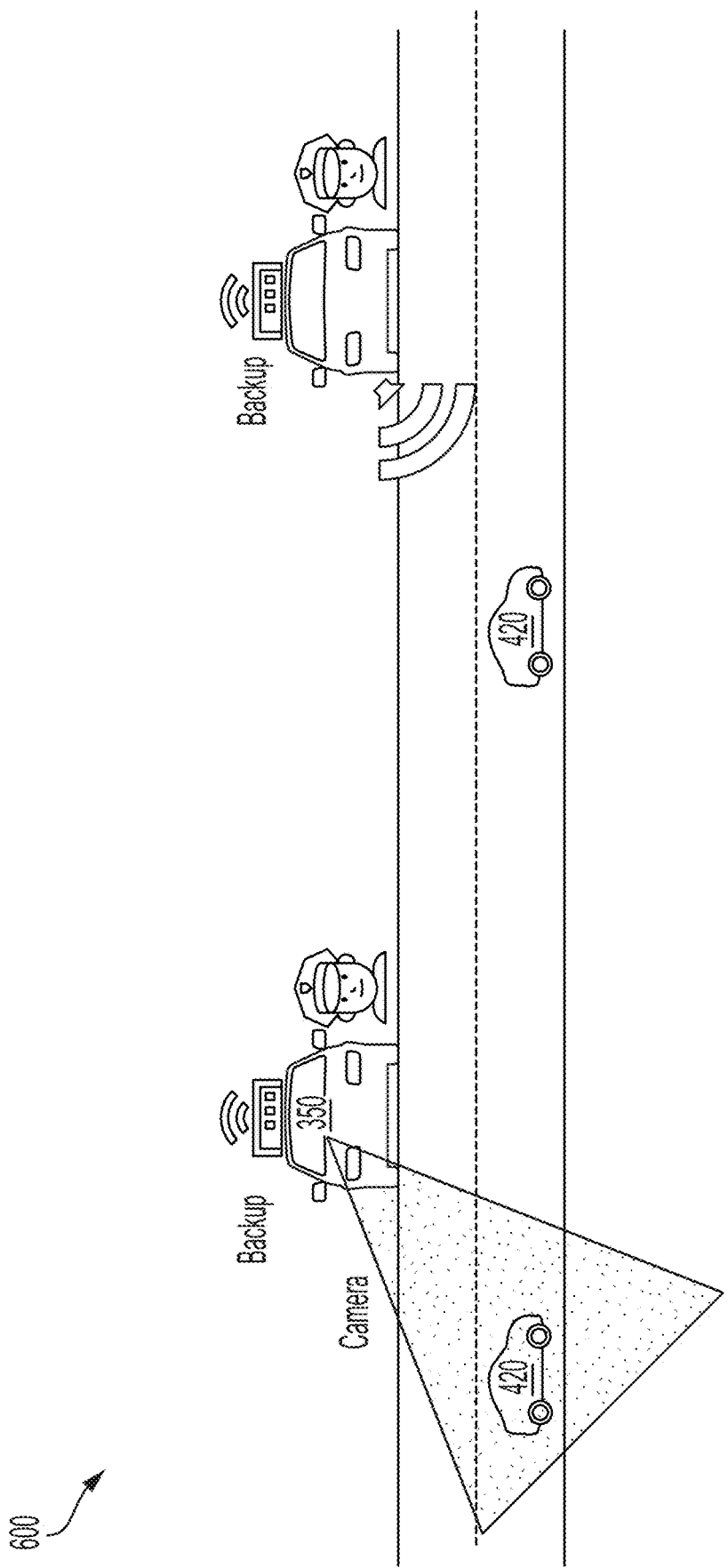
FIG. 6 is a block diagram illustrating a highway traffic enforcement event for dispatching a police vehicle backup roadside unit (RSU), according to aspects of the present disclosure.

FIG. 6 is a block diagram illustrating a highway traffic enforcement event 600 for dispatching a police vehicle backup RSU, according to aspects of the present disclosure. The highway traffic enforcement event 600 is an example of a road-side traffic enforcement event (e.g., bus lane enforcement, red light enforcement, stop sign enforcement, license plate recognition enforcement, high-occupancy vehicle lane enforcement, etc.). In this example, the car 350 (e.g., police car) is dispatched to the highway traffic enforcement event 600 and parked at a fixed location. In operation, the car 350 monitors (e.g., LiDAR or camera) connected vehicles 420 at the highway traffic enforcement event 600.

FIG. 7 is a system block diagram illustrating a backup vehicle RSU system 700 described with reference to the marathon event 500 of FIG. 5, according to aspects of the present disclosure. As noted, the marathon event 500 is a social event, which occasionally happens in urban areas. During the marathon event 500, on-demand RSU services are desired to appropriately regulate the traffic signals to stop/slow down oncoming vehicles (e.g., connected vehicles 420) so that runners can complete their races safely and without any disturbance. Unfortunately, over-regulation of the vehicle flow (e.g., blocking all the roadways during a certain period of time) also causes unnecessary traffic congestion.

In this scenario, on-demand backup RSU services are provided by the car 350, which is programmed with a specific instruction to regulate the traffic flow. The car 350 may regulate traffic flow by: (1) monitoring runners in the proximity with an on-board sensor, (2) communicating with a traffic signal to change the current signal to adjust the vehicle flow, and (3) displaying a warning message (e.g., caution, slow down, new speed limit) on the windshield. In this example, the backup vehicle RSU system 700 configured to provide on-demand backup RSU services includes a requester 710, a server 720, and the car 350.

In this aspect of the present disclosure, the requester 710 is configured to describe the scene (e.g., marathon event 500) in a machine-readable (e.g., understandable) format. The requester 710 informs the server 720 to dispatch a vehicle backup RSU (e.g., car 350) to the area of interest (e.g., marathon event 500). In this case, for example, the requester 710 is a management team of the marathon event 500. The requester 710 is responsible for providing a scene description 712 of the temporary event such as a location, type of event, aspects to be monitored or controlled at the scene. The scene description 712 (see Table 1) is provided to the server 720 in a machine-readable format for processing by the server 720.

The server 720 receives the scene description 712 from the requester 710. In response to the scene description 712, the server 720 is responsible for extracting a resource specification 722 (see Table 2). In this aspect of the present disclosure, the resource specification 722 describes the hardware/software capability to support on-demand RSU services at the marathon event 500. For example, the resource specification 722 describes what kind of objects can be detected (e.g., pedestrians), type of control, computation(s), and communication provided at the marathon event 500. The details of the resource specification 722 are provided in further detail below. The server 720 may look up previous (e.g., historical) data from a database 702 to find a best match between the scene description (e.g., Table 1) and the resource specification (e.g., Table 2). This process is further described in FIGS. 8 and 9. After extracting the resource specification 722, the server 720 distributes the resource specification 722 to a fleet vehicle management 730 that eventually selects a backup car (e.g., car 350).

In one aspect of the present disclosure, the fleet vehicle management 730 is responsive to the resource specification 722. In particular, upon receipt of the resource specification 722, the fleet vehicle management 730 is configured to check an inventory of cars according to the resource specification 722. In this example, the fleet vehicle management 730 identifies an appropriate car whose hardware equipment (e.g., sensors, actuators) matches the resource specification 722. Next, the fleet vehicle management 730 sends a dispatch instruction to the selected car with which the car can be dispatched to the scene.

As shown in FIG. 7, the fleet vehicle management 730 integrates the concept of car sharing fleet according to aspects of the present disclosure. For example, when a backup RSU vehicle is requested in a certain area, the fleet vehicle management 730 contacts a car sharing service (e.g., Uber, Lyft, Toyota Palette, etc.) to check if there are available cars for to serve as RSU backup vehicle. This aspect of the present disclosure specifies information exchanged to deploy a car from the car sharing service to operate as a backup RSU vehicle. For example, the fleet vehicle management 730 may integrate with a pricing model. The fleet vehicle management 730 may issue a deployment instruction to provide guidance and/or instruction for the car to operate as a backup RSU vehicle (e.g., showing a precise GPS location where the car needs to be parked, direction, . . . ) by providing on-demand RSU services at a requested site.

Figures 11A, 11B, 11C:
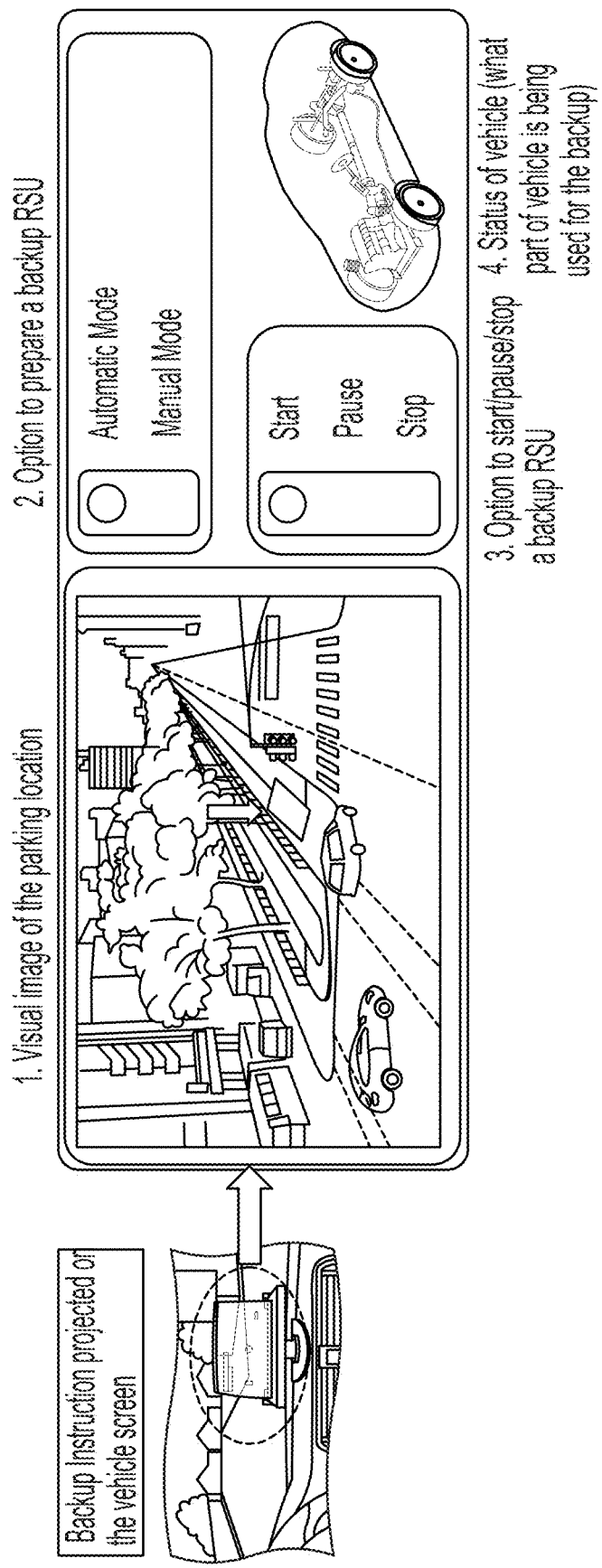
FIGS. 11A to 11C illustrate deploying of a backup roadside unit (RSU) vehicle to a traffic site for providing on-demand RSU services, according to aspects of the present disclosure.

When the car 350 arrives at the marathon event 500, an appropriate message is displayed in the car display to appropriately park the car for performing the requested on-demand RSU functionality, for example, as shown in FIG. 11A. For example, the backup instruction describes a specific parking place where the car 350 is parked. In addition, the backup instruction may include an option to configure the car 350 in an automatic or manual manner to operate the specified sensors and/or actuators. Once all settings specified by the backup instruction are complete, the car 350 initiates the backup operation to provide on-demand RSU services at the marathon event 500. In addition, the server 720 continuously monitors the car 350 at run time, and if a malfunction occurs, the server 720 dispatches other backup cars to the marathon event 500. When the marathon event 500 is complete, the car 350 returns to the fleet vehicle management 730 or another specified location.

Figure 8:
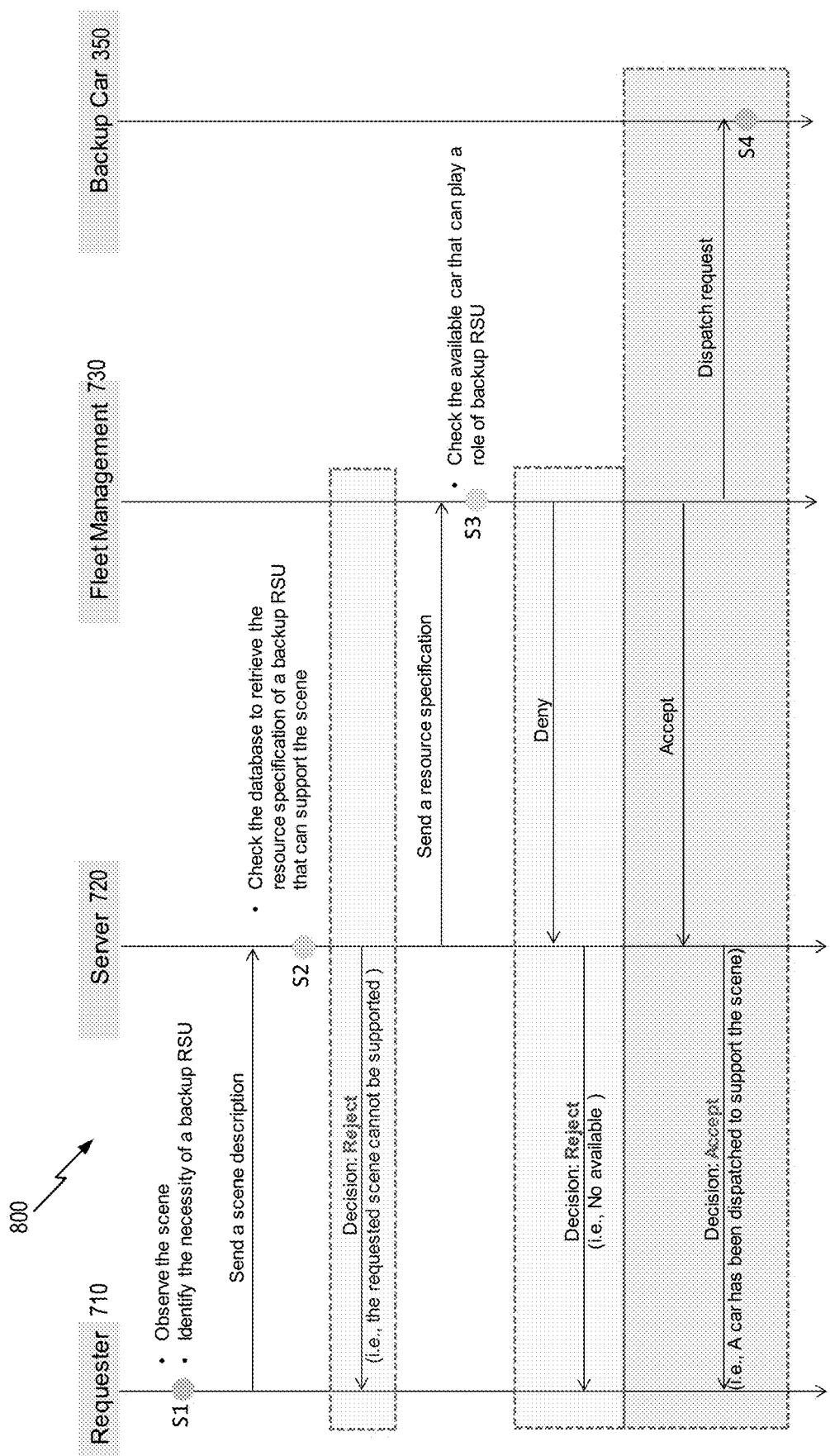
FIGS. 8 and 9 illustrate a communication sequence among participants of the vehicle backup roadside unit (RSU) system to provide on-demand RSU services at a requested site, according to aspects of the present disclosure.
Figure 9:
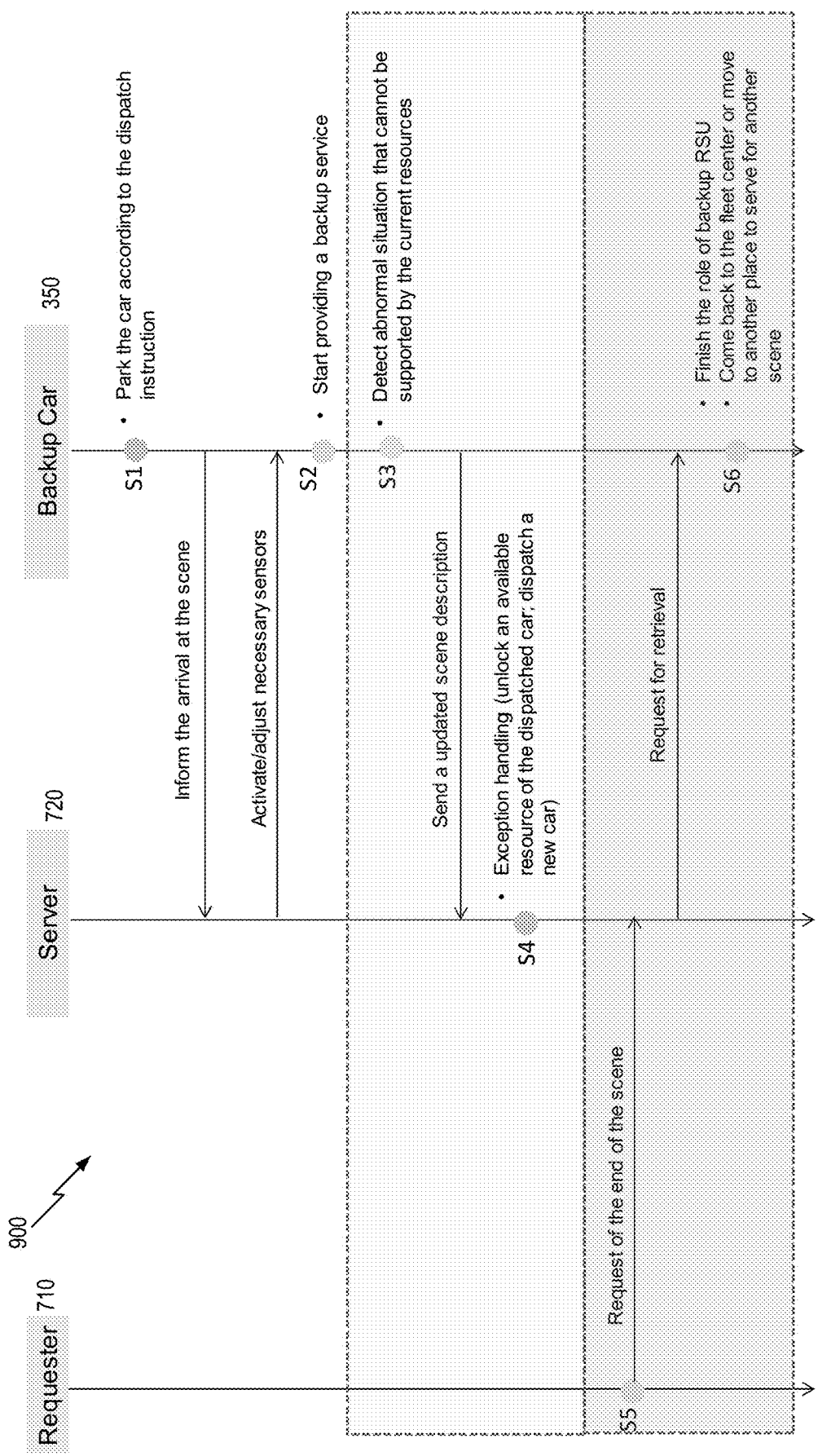

FIGS. 8 and 9 illustrate a communication sequence among participants of the vehicle backup RSU system to provide on-demand RSU services at a requested site according to aspects of the present disclosure.

FIG. 8 illustrates a request stage communication sequence 800 according to aspects of the present disclosure. At step S1, the requester 710 identifies the desire for backup on-demand RSU services support at a particular scene (e.g., the marathon event 500). The requester 710 then sends a scene description 712 (see Table 1) of the desired on-demand RSU services to the server 720.

At step S2, upon receiving the scene description 712, the server 720 checks the database 702 to determine if the requested scene can be supported by a backup RSU. In this example, the database 702 maintains a past history of scene descriptions; types of vehicles previously used to support a similar scene; and a level of success achieved by the backup RSU in supporting the scene. In addition, the database 702 maintains a resource specification (see Table 1) matching the scene description. The server 720 sends a [Reject] message to the requester 710 if the server 720 determines from the database 702 the scene cannot be supported by a backup RSU or supporting the scene has failed previously. If the server 720 finds a matching resource specification from the database 702, it sends the resource specification 722 to the fleet vehicle management 730.

At step S3, upon receiving the resource specification 722, the fleet vehicle management 730 determines if a car is available to play the role of a requested backup RSU. If there are no available cars, the fleet vehicle management 730 sends a [Deny] message to the server 720, which eventually sends a [Reject] message to the requester 710. If there are available cars matched to the resource specification 722, the fleet vehicle management 730 sends a [Dispatch request] message to the selected backup car. The [Dispatch request] message may trigger remote programming (e.g., an over-the-air (OTA) update, such as a delta update) of the selected backup car (e.g., the car 350) to support backup on-demand RSU features based on the resource specification 722. The fleet vehicle management 730 concurrently sends an [Accept] message to the server 720, eventually informing the requester 710 of the car 350 dispatched to support the scene (e.g., the marathon event 500).

FIG. 9 illustrates a dispatch stage communication sequence 900 according to aspects of the present disclosure. At step S1, once the car 350 receives the dispatch request from the fleet vehicle management 730, the car 350 (once programmed with an OTA update) can drive to the scene. The car 350 parks at the appropriate parking location according to the backup instruction sent by the server 720 (see Table 2). Next, the car 350 informs the server 720 of its arrival at the scene. Upon confirming the arrival of the car 350, the server 720 may remotely activate/adjust/calibrate the sensors and actuators of the car 350 to perform backup on-demand RSU services. In one aspect of the present disclosure, the server 720 sends an OTA update to the car 350. The OTA update may enable the on-demand RSU module 310 of the car 350 to provide on-demand RSU services (e.g., traffic management module).

After setting up the sensors/actuators according to the OTA update, the car 350 starts providing the requested backup RSU services at step S2. During the operation, the car 350 may encounter an unexpected situation that was not included as a part of the scene description at step S3. Due to the unexpected situation, the car 350 can no longer provide the backup on-demand RSU function. For example, the marathon event 500 may encounter severe weather conditions, rendering the car 350 unable to detect the marathon runners using a camera sensor. In this case, the car 350 may send an updated scene description (describing severe weather conditions) to the server 720. Upon receiving such an exception, at step S4, the server 720 may unlock the available resource of the car 350 or recall the car 350 and dispatch a new backup RSU vehicle to the scene.

At step S5, the requester 710 may inform the server 720 of the end of the scene (e.g., the marathon event finished). At step S6, the server 720 asks the car 350 to terminate the on-demand RSU functions, and return to a fleet center or another place to serve for another scene by the fleet vehicle management 730.

TABLE 1

Scene Description

| Type | Sub category | Example |
|---|---|---|
| Scene ID | — | Uniquely assigned scene ID (this ID is used to look up any previously registered scene) |
| Location | Address | 300 Post St. San Fransisco, CA 94108 37.788, −122.406 |
| Event name | — | San Francisco Marathon |
| Event category | Social Event | Marathon |
| | Police Enforcement | Speed violation |
| | Road Construction | Road pavement |
| | Severe Weather | Heavy snow |
| Road type | — | Highway, City, School Zone, Freeway |
| Monitor required | Pedestrian | Pedestrians crossing the intersection need to be monitored |
| | High speed vehicle | Vehicles that exceed the speed limit need to be monitored |
| | Weather condition | The level of snowfall needs to be monitored |
| Control required | Lighting | A dark region should be lighted with a certain intensity |
| | Traffic signal control | The traffic signal in the intersection should change to red when a group of runners is crossing |
| | Display | The warning of road obstacle should be displayed in the windshields |
| Computation required | Computation type | HD map generation, trajectory prediction, . . . |
| | Computation latency | 10 sec latency to produce the output |
| | Data size | 500 MB input size per request |

TABLE 2

Resource Specification

| Type | Sub category | Example |
|---|---|---|
| Detection of surrounding environment | Detection range | 45°, 90°, 180° |
| | Detection direction | Front, rear, right, left |
| | Detection type | Binary class (presence/absence), multi class (pedestrian, cars, weather conditions . . .) |

TABLE 2-continued

Resource Specification

| Type | Sub category | Example |
| --- | --- | --- |
| Control | Control type | Display, sound, object following, route following |
| | Control range | Display screen size, the speed range of object/route following, . . . |
| | Control limitation | Available all the time, Available on highway only, Not available in curve roads, . . . |
| Computation | Memory size | 500 MB, 1 GB |
| | Computation speed | 1 GHz |
| | Computation type | Machine learning training, control parameter calculation, trajectory prediction, . . . |
| Communication | Communication protocol | DSRC, 4G, 5G, WiFi, . . . |
| | Communication range | 300 meters, 1 km, . . . |
| | Communication bandwidth | 500 Mbps, . . . |

Tables 1 and 2 illustrate a scene description and a resource specification to dispatch a vehicle back-up RSU to provide on-demand RSU services at a requested site, according to aspects of the present disclosure.

Table 1 illustrates a scene description of a site requesting on-demand RSU services, according to aspects of the present disclosure. The scene description in Table 1 is machine-readable information that describes pertinent information for RSUs to lend support at a scene having a temporary event. The scene description 712 is generated by the requester 710 and sent to the server 720 to extract a matched resource specification of a selected backup RSU vehicle. A scene (e.g., the construction site 400) may be assigned a unique ID that is distinguished from other scenes. Using the ID, the server 720 may identify a similar request in the future, and dispatch a similar backup car, dispatched before to support the same scene.

In addition, the scene description of Table 1 includes a location, an event name, a category, and a road type where the backup RSU vehicle is deployed. In this example, the scene description specifies three additional aspects desired from an ideal RSU: (1) the aspects to be monitored, (2) the aspects to be controlled, and (3) the aspects to be computed. With these objectives in the scene description 712, the server 720 can extract the necessary resource specification 722, as shown in Table 2.

Table 2 illustrates a resource specification determined from a scene description of a site requesting on-demand RSU services, according to aspects of the present disclosure. The resource specification is machine-readable information that describes the expected hardware/software capability of a vehicle. The server 720 is responsible for creating the resource specification 722 based on the information in the scene description 712. The resource specification may include what type of environments are detected by the car 350 to perform the role of an RSU; what types of control/computation/communication capability should be provided by the car 350. The server 720 sends the resource specification 722 to the fleet vehicle management 730 to select a backup RSU vehicle to support a scene.

Figure 10:
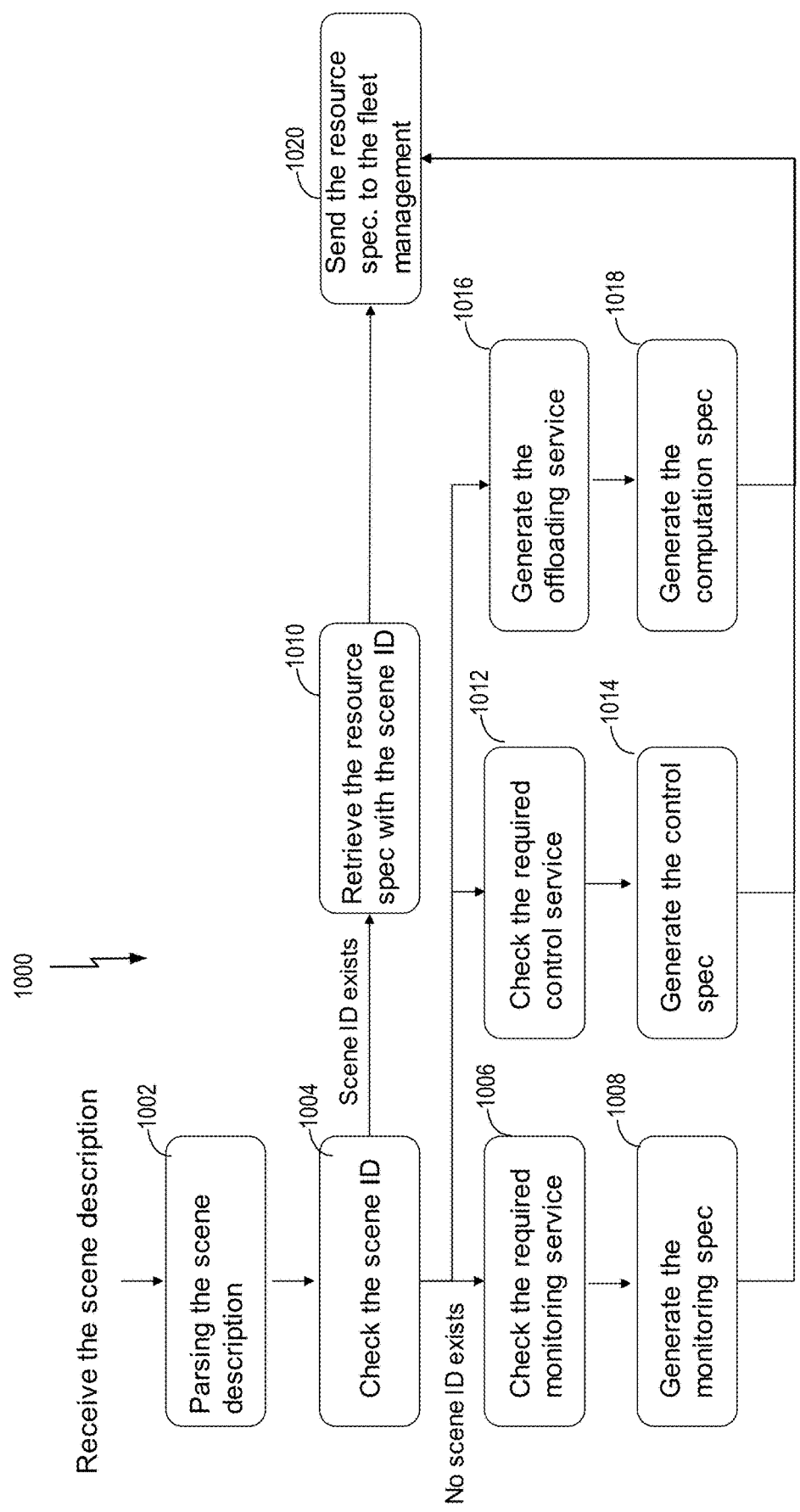
FIG. 10 is a flowchart illustrating a method for retrieving a resource specification from a scene description, according to aspects of the present disclosure.

FIG. 10 is a flowchart illustrating a method for retrieving a resource specification from a scene description, according to aspects of the present disclosure. A method 1000 of FIG. 10 begins at block 1002, in which a scene description is parsed in response to receiving the scene description. For example, as shown in FIG. 7, the server 720 parses the scene description 712. At block 1004, a scene ID is checked. When checking of the scene ID identifies a matching scene ID, at block 1006, the resource specification associated with the scene ID is retrieved. At block 1020, the resource specification is sent to the fleet vehicle management. For example, the server 720 sends the resource specification 722 to the fleet vehicle management 730.

By contrast, when checking of the scene ID does not identify a matching scene ID, at block 1006, a required monitoring service is checked. At block 1008, a monitoring specification is generated. In addition, at block 1012, a required control service is checked. At block 1014, a control specification is generated. Similarly, at block 1016, an offloading service is generated. At block 1018, a computation specification is generated, in which control flow branches to block 1020, in which a resource specification is sent to the fleet vehicle management. For example, the server 720 sends the resource specification 722 to the fleet vehicle management 730.

It should be noted the scene description in Table 1 does not specify any car-specific information. The scene description in Table 1 primarily describes types of support specified for the scene, independent of the vehicle type. By contrast, the resource specification of Table 2 provides a vehicle-centric description. Aspects of the present disclosure consider two different types of specifications (e.g., the scene description and the resource description) even if they are eventually used for the same purpose (e.g., dispatching a backup RSU to support a scene).

From the perspective of requester 710, the scene description 712 focuses on the requested support for the scene without giving specific details of the car deployed. Car specific details are generally omitted from the scene description 712 because it may be difficult for the requester 710 to understand car-specific details to support the scene due to lack of expertise regarding the car deployed. Instead, the requester 710 is typically an expert in describing what types of support is requested to support the scene. This is generally the reason the scene description 712 intentionally hides the car-specific details.

Nevertheless, some subsystems transform the scene description 712 into car-specific information eventually to identify an appropriate backup car. The server 720 is assigned this responsibility. For this purpose, the server 720 maintains the database 702 of both the scene description 712 and the resource specification 722 used in the past. If a certain scene was requested before, the server 720 looks up the database 702 to extract the matched resource specification. If the scene is newly requested, the server 720 identifies what types of sensing, control, computation, and communication capability are requested, and generates the resource specification 722 in a machine readable format that is delivered to the fleet vehicle management 730. Information matching in the database 702 can be implemented in many different ways, and aspects of the present disclosure contemplate various specific implementation strategies of performing the matching process. For example, a rule table is set up to directly match a scene to a resource specification. Alternatively, a machine learning approach may be used to extract a resource specification based on historical data.

FIGS. 11A to 11C illustrate deploying of a backup RSU vehicle to a traffic site for providing on-demand RSU services according to aspects of the present disclosure. As shown in FIG. 11A, once the car 350 arrives at the scene, the car 350 is provided a specific instruction of where to park, which is important to serve the on-demand RSU functionality. FIG. 11B shows a visual image of the parking location for the car 350. Hence, the server 720 sends a visual instruction to the car 350 to direct parking in an appropriate way to serve the scene, which may be displayed on the vehicle screen shown in FIG. 11A. The parking instruction should be detailed enough as the parking position directly affects the visibility of the sensor of the car 350.

FIG. 11C illustrates various options for directing operation of the car 350. Representatively, FIG. 11C illustrates options available to prepare a backup RSU car, options to start/pause/stop the backup RSU car, and an option for vehicle status. For example, a driver may choose an automatic or manual mode to park the car according to the received instruction. The driver can also choose the timing to start/pause/stop the RSU functionality. In addition, the car may display which parts of the car are currently being used for the RSU functionality. This example illustrates a visual instruction for the backup RSU vehicle. It should be noted aspects of the present disclosure are not just limited to a parked RSU vehicle. For example, the backup RSU vehicle may move over time, thereby serving its purpose in a more dynamic fashion. In addition, multiple vehicles can cooperate and coordinate to collectively provide on-demand RSU services.

In some aspects, the methods shown in in FIGS. 8-10 may be performed by the SOC 100 (FIG. 1) or the software architecture 200 (FIG. 2) of the autonomous vehicle 150. That is, each of the elements of methods may, for example, but without limitation, be performed by the SOC 100, the software architecture 200, the processor (e.g., CPU 102) and/or other components included therein of the autonomous vehicle 150, or the on-demand RSU module 310 of the backup RSU vehicle system 300.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for deploying of a backup autonomous police vehicle to provide on-demand roadside unit (RSU) traffic violation enforcement services, the method comprising:
   determining, by a server, a resource specification to deploy the backup autonomous police vehicle to a requested site in response to a scene description received from a requestor to provide the on-demand RSU traffic violation enforcement services;

sending a dispatch instruction to a selected backup autonomous police vehicle to deploy the selected backup autonomous police vehicle to a requested site, in which a hardware or software capability of the selected backup autonomous police vehicle is matched to the resource specification; and remotely programing the selected backup autonomous police vehicle by transmitting an over-the-air (OTA) update to the selected backup autonomous police vehicle to assign RSU traffic violation enforcement functions to the selected backup autonomous police vehicle to monitor vehicles at the requested site and detect bus lane enforcement violations and high-occupancy vehicle lane enforcement violations at the requested site using a camera of the backup autonomous police vehicle based on the resource specification to provide the on-demand RSU traffic violation enforcement services.

2. The method of claim 1, further comprising sending, by the server, the resource specification to a fleet vehicle management to select the selected backup autonomous police vehicle.

3. The method of claim 2, further comprising:
selecting, by the fleet vehicle management in response to receiving the resource specification, the selected backup autonomous police vehicle matched to the resource specification; and
dispatching the selected backup autonomous police vehicle to the requested site.

4. The method of claim 1, further comprising driving to the requested site by the selected backup police autonomous vehicle upon receiving the dispatch instruction from a fleet vehicle management and a visual instruction from the server.

5. The method of claim 4, further comprising sending, by the selected backup autonomous police vehicle, an updated scene description to the server upon encountering a situation outside of the scene description at the requested site.

6. The method of claim 5, further comprising:
enabling, by the server, additional resources available from the selected backup autonomous police vehicle in response to the updated scene description; or
recalling the selected backup autonomous police vehicle and dispatching a new backup autonomous police vehicle to serve the updated scene description if the additional resources of the selected backup autonomous police vehicle are unsupported.

7. The method of claim 1, further comprising:
identifying, by the requestor, a temporary event for backup RSU speed violation enforcement services to support the requested site;
generating the scene description according to the temporary event for backup RSU speed violation enforcement; and
sending the scene description to the server to deploy the selected backup autonomous police vehicle to the requested site.

8. The method of claim 7, in which generating the scene description comprises forming request information in a machine-readable format, including a location, an event name, a category, and a road type to deploy the selected backup autonomous police vehicle.

9. The method of claim 1, in which the resource specification is a machine-readable format describing the hardware or software capability of the selected backup autonomous police vehicle, and types of control or computation or communication capability provided by the selected backup autonomous police vehicle.

10. A system to deploy a backup autonomous vehicle to provide on-demand roadside unit (RSU) traffic violation enforcement services, the system comprising:
a server configured to determine a resource specification to deploy a selected backup autonomous police vehicle to a requested site in response to a scene description received from a requestor; and
a fleet vehicle management system configured to send a dispatch instruction to the selected backup autonomous police vehicle to deploy the selected backup autonomous police vehicle to the requested site, in which a hardware or software capability of the selected backup autonomous police vehicle is matched to the resource specification received from the server to provide the on-demand RSU traffic violation enforcement services, and
in which the fleet vehicle management system is configured to remotely program the selected backup autonomous police vehicle by transmitting an over-the-air (OTA) update to the selected backup autonomous police vehicle to assign RSU traffic violation enforcement functions to the selected backup autonomous police vehicle to monitor vehicles at the requested site and detect bus lane enforcement violations and high-occupancy vehicle lane enforcement violations at the requested site using a camera of the backup autonomous police vehicle based on the resource specification to provide the on-demand RSU traffic violation enforcement services.

11. The system of claim 10, in which the server is further configured to issue a visual instruction to the selected backup autonomous police vehicle.

12. The system of claim 10, in which the server is further configured to receive, from the selected backup autonomous police vehicle, an updated scene description in response to encountering a situation outside of the scene description at the requested site.

13. The system of claim 12, in which the server is further configured to enable resources available from the selected backup autonomous police vehicle in response to the updated scene description, and configured to recalling the selected backup autonomous police vehicle and dispatch a new backup autonomous police vehicle to serve the updated scene description.

14. The system of claim 10, in which the resource specification is a machine-readable format describing the hardware or software capability of the selected backup autonomous police vehicle, and types of control or computation or communication capability provided by the selected backup autonomous police vehicle.

15. A non-transitory computer-readable medium having program code recorded thereon for deploying of a backup autonomous vehicle to provide on-demand roadside unit (RSU) traffic violation enforcement services, the program code being executed by a processor and comprising:
program code to determine, by a server, a resource specification to deploy a selected backup autonomous police vehicle to a requested site in response to a scene description received from a requestor;
program code to send a dispatch instruction to the selected backup autonomous police vehicle to deploy the selected backup autonomous police vehicle to the requested site, in which a hardware or software capability of the selected backup autonomous police vehicle is matched to the resource specification to provide the on-demand RSU traffic violation enforcement services; and program code to remotely program the selected backup autonomous police vehicle by transmitting an over-the-air (OTA) update to the selected backup autonomous police vehicle to assign RSU traffic violation enforcement functions to the selected backup autonomous police vehicle to monitor vehicles at the requested site and detect bus lane enforcement violations and high-occupancy vehicle lane enforcement violations at the requested site using a camera of the backup autonomous police vehicle based on the resource specification to provide the on-demand RSU traffic violation enforcement services.

16. The non-transitory computer-readable medium of claim 15, further comprising:

program code to enable, by the server, additional resources available from the selected backup autonomous police vehicle in response to an updated scene description received from the selected backup autonomous police vehicle; and program code to recall the selected backup autonomous police vehicle and dispatch a new backup autonomous vehicle to serve the updated scene description if the additional resources of the selected backup autonomous police vehicle are unsupported.

17. The non-transitory computer-readable medium of claim 15, further comprising:

program code to select, by a fleet vehicle management module in response to receiving the resource specification from the server, the selected backup autonomous police vehicle matched to the resource specification; and program code to dispatch the selected backup autonomous police vehicle to the requested site.

* * * * *